(12) United States Patent
Chen et al.

(10) Patent No.: US 10,404,614 B2
(45) Date of Patent: Sep. 3, 2019

(54) MULTI-CLOUD RESOURCE ALLOCATION

(71) Applicant: VMware, Inc., Palo Alto, CA (US)

(72) Inventors: Ping Chen, Shanghai (CN); Wei Zhang, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 254 days.

(21) Appl. No.: 15/356,674

(22) Filed: Nov. 21, 2016

(65) Prior Publication Data

US 2018/0145923 A1   May 24, 2018

(51) Int. Cl.
*H04L 12/00* (2006.01)
*H04L 12/911* (2013.01)
*H04L 29/08* (2006.01)
*G06F 9/50* (2006.01)

(52) U.S. Cl.
CPC ............ *H04L 47/70* (2013.01); *G06F 9/5027* (2013.01); *H04L 67/10* (2013.01); *H04L 67/2809* (2013.01)

(58) Field of Classification Search
CPC ............. H04L 63/0807; H04L 12/1827; H04L 12/911; H04L 29/08; H04L 47/70; H04L 67/34; H04L 67/10; H04L 12/5695
USPC ......................................... 709/201, 204, 226
See application file for complete search history.

(56) References Cited

U.S. PATENT DOCUMENTS

| 8,230,070 | B2* | 7/2012 | Buyya | G06F 9/5072 709/201 |
|---|---|---|---|---|
| 8,352,611 | B2* | 1/2013 | Maddhuri | G06F 9/5005 705/2 |
| 8,910,278 | B2* | 12/2014 | Davne | H04L 63/0272 705/2 |
| 8,984,505 | B2* | 3/2015 | Ferris | G06F 9/5027 718/1 |
| 9,189,294 | B2* | 11/2015 | Considine | G06F 9/5088 |
| 2011/0016214 | A1* | 1/2011 | Jackson | G06F 9/5044 709/226 |
| 2011/0184993 | A1* | 7/2011 | Chawla | G06F 9/45533 707/802 |
| 2012/0096271 | A1* | 4/2012 | Ramarathinam | H04L 63/0807 713/172 |
| 2012/0179824 | A1* | 7/2012 | Jackson | G06F 9/5027 709/226 |
| 2012/0254433 | A1* | 10/2012 | Gujral | G06F 9/5072 709/226 |
| 2012/0303736 | A1* | 11/2012 | Novotny | H04L 67/1097 709/213 |

(Continued)

*Primary Examiner* — Frantz Coby
(74) *Attorney, Agent, or Firm* — Su IP Consulting

(57) ABSTRACT

An example method for allocating resources in a multi-cloud environment may include receiving, by an allocation broker executing in the multi-cloud environment, a client request to create an allocation of cloud resource in a plurality of clouds. The method may include receiving, by the allocation broker from a reservation broker, a reservation candidate based on a reservation type. The reservation candidate is associated with a cloud, and the cloud corresponds to a cloud broker. The method may further include invoking, by the allocation broker, a location handler corresponding to the reservation type to identify a reservation in the cloud having sufficient resource quota to support the allocation of cloud resource, and invoking, by the allocation broker, an allocation handler corresponding to the reservation type to create the allocation of cloud resource in the reservation.

20 Claims, 3 Drawing Sheets

(56) References Cited

U.S. PATENT DOCUMENTS

| | | | |
|---|---|---|---|
| 2013/0160008 A1* | 6/2013 | Cawlfield | G06F 9/45558 718/1 |
| 2013/0273881 A1* | 10/2013 | Sadeghi | H04W 76/10 455/406 |
| 2014/0280595 A1* | 9/2014 | Mani | H04L 12/1827 709/204 |
| 2014/0365662 A1* | 12/2014 | Dave | G06F 9/45533 709/226 |
| 2015/0067171 A1* | 3/2015 | Yum | G06F 9/5072 709/226 |
| 2016/0019636 A1* | 1/2016 | Adapalli | G06Q 30/0641 705/26.62 |
| 2016/0105393 A1* | 4/2016 | Thakkar | H04L 41/0823 709/220 |
| 2018/0145989 A1* | 5/2018 | Das | H04L 63/10 |

* cited by examiner

MULTI-CLOUD RESOURCE ALLOCATION

BACKGROUND

A cloud automation product may be used to perform cloud management operations on a cloud system. The resources and services provided by the cloud system are designed for shared usage. When certain cloud resource does not have the capacity to accommodate multiple cloud service consumers' requirements, a cloud resource constraint may occur. Other types of runtime conflicts can occur when a cloud resource (especially one not specifically designed to accommodate sharing) is concurrently accessed by different cloud service consumers. For example, when one resource pool can temporarily borrow resources from other resource pools, a runtime conflict can be triggered when the borrowed resource is not returned due to prolonged usage by the borrowing cloud service consumer.

Thus, the cloud management operations include the reserving of resources by multiple cloud service consumers, in order to reduce or eliminate issues caused by resource constraints and conflicts. Reserved resources may need to be allocated before being used by the cloud service consumers. The allocated resources may need to be de-allocated when not needed any more. Different cloud systems may have different approaches to reserve and allocate their respective cloud resources. However, there is no uniform approach to allocate or de-allocate resources from multiple different cloud systems in a consistent and extensible way.

SUMMARY

System and methods for allocating resources in a multi-cloud environment are provided. The method may include receiving, by an allocation broker executing in the multi-cloud environment, a client request to create an allocation of cloud resource in a plurality of clouds. The method may include receiving, by the allocation broker from a reservation broker, a reservation candidate based on a reservation type. The reservation candidate is associated with a cloud, and the cloud corresponds to a cloud broker. The method may further include invoking, by the allocation broker, a location handler corresponding to the reservation type to identify a reservation in the cloud having sufficient resource quota to support the allocation of cloud resource, and invoking, by the allocation broker, an allocation handler corresponding to the reservation type to create the allocation of cloud resource in the reservation.

DETAILED DESCRIPTION

Figure 1:
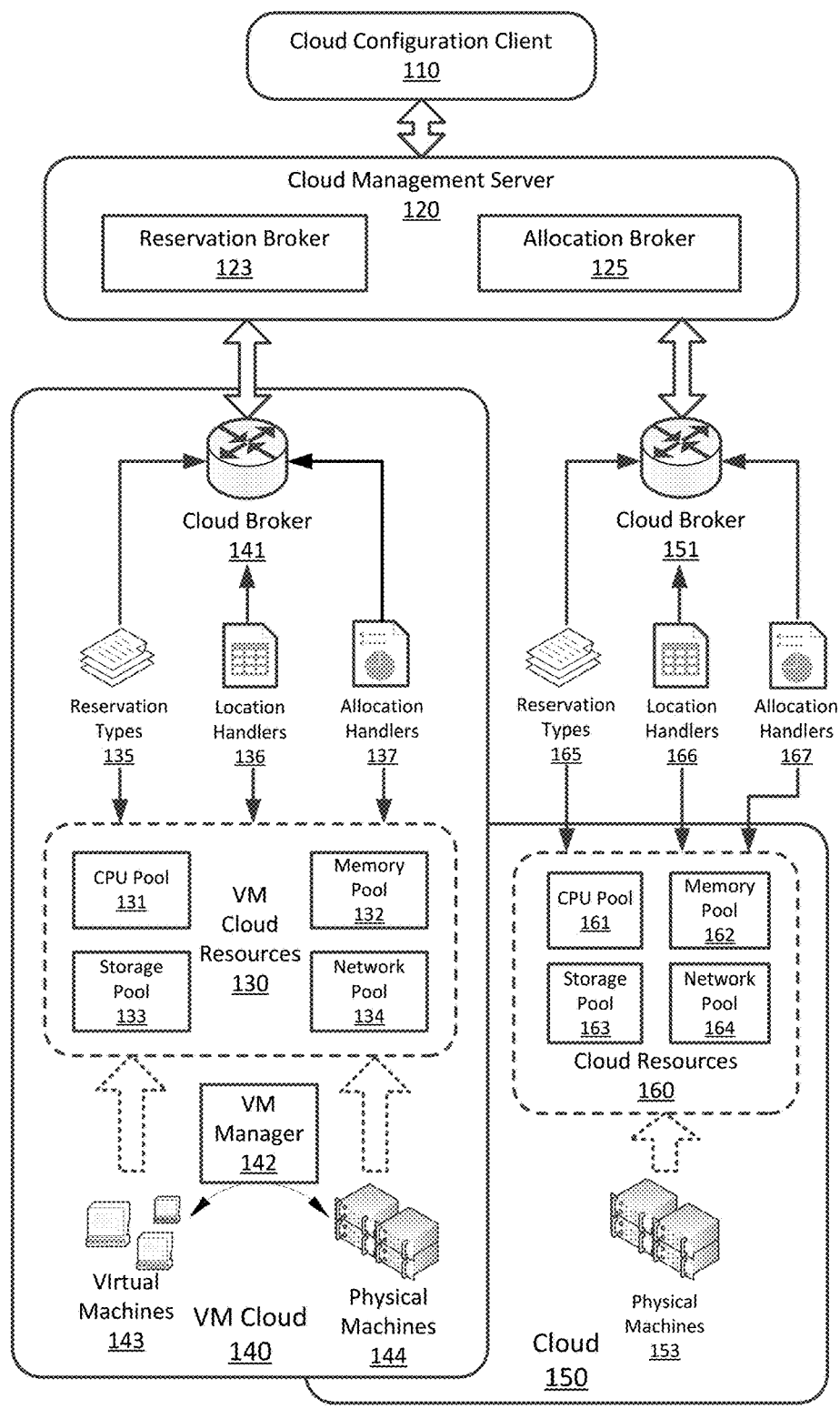
FIG. 1 illustrates a block diagram of a virtualized system capable of performing cloud resource allocation in a multi-cloud environment, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of a virtualized system capable of performing cloud resource allocation in a multi-cloud environment, according to one or more embodiments of the present disclosure. In FIG. 1, the multi-cloud environment may include one or more VM clouds 140 and one or more clouds 150. The system may include a cloud management server 120, which may interact with one or more cloud configuration clients 110. The cloud management server 120 may be configured to manage the clouds 140 and 150 in the multi-cloud environment. Specifically, the cloud management server 120 may be configured to perform cloud resources allocation in the multi-cloud environment.

In some embodiments, a "cloud" (e.g., the cloud 150) in the multi-cloud environment may be a network-based, computing architecture that provides shared pools of cloud resources on demand. In comparison, a "virtual machine cloud" (or VM cloud) in the multi-cloud environment may be a cloud implemented using some virtualized computing resources. The VM cloud 140 may contain, among other components, one or more VMs (e.g, VMs 143) and physical machines 144. The cloud 150 may contain, among other components, one or more physical machines 153. The cloud management server 120 may be responsible for managing the VM cloud 140 and cloud 150, and implementing the various cloud functionalities such as resource pooling, resource allocating, high-availability, and automation etc. In some embodiments, the VM cloud 140 may be constructed using products such as VMWARE® vCloud. The cloud management server 120 may be implemented using a VMWARE® vRealize Suite.

In some embodiments, the cloud configuration client 110 may be installed on a client computer (e.g., a personal computer or workstation) to connect to the cloud management server 120 for accessing and managing the clouds 140 and 150, as well as the VMs contained therein. The cloud configuration client 110 may interact with the cloud management server 120 via Transmission Control Protocol/Internet Protocol (TCP/IP), Hypertext Transfer Protocol (HTTP), or any other network communication means. Alternatively, the cloud configuration client 110 may be implemented as a software/hardware module executing directly on the cloud management server 120. In some embodiments, the cloud configuration client 110 may be implemented using a VMWARE® vSphere client.

In some embodiments, the cloud management server 120 may construct a VM cloud (e.g., VM cloud 140) using a VM manager 142. Specifically, the VM manager 142 may create one or more VMs 143 in the VM cloud 140, and provide centralized management of the VMs 143 such as managing VM creation, VM configuration, VM updates, VM cloning, etc. Based on the created VMs 143, the VM manager 142 may construct the VM cloud 140, and implement cloud-based functionalities such as VM high-availability, VM load-balancing, VM resource distributions, etc. In some embodiments, the VM manager 142 may be a VMWARE® vCenter server installed on MICROSOFT WINDOWS® server or a LINUX® server.

In some embodiments, the VM manager 142 may create a VM 143 based on one or more physical machines 144. The physical machine 144 may be a physical computer system having a "physical hardware platform" (e.g., an x86 architecture platform). The physical machine 144 may include a "hypervisor", which is configured to construct a "virtual hardware platform" for the VMs 143 based on the physical machine 144's physical hardware platform. In other words, a "virtual machine" (VM) 143 may be an abstraction of an actual physical machine 144. The VM manager 142 may coordinate the multiple hypervisors associated with the VMs 143 together to form a distributed (virtual) system (e.g., the VM cloud 140). Thus, the VM cloud 140 may be constructed using multiple physical machines 144, and using multiple VMs 143 that are created based on some of the physical machines 144.

In some embodiments, the physical machines 144 may include various "physical hardware components" such as, without limitation, one or more physical Central Processing Units (CPUs), physical memory, physical storage (e.g., hard drive), physical Network Interface Card (NIC), and/or additional electronic circuit components (all of which are not shown in FIG. 1). The physical CPU may be a general-purpose or specialized computing processor having electronic circuitry to perform arithmetical, logical, and input/output operations for the physical hardware platform. The physical CPU may be configured to support functions of the VM 143 and/or the VM manager 142. The physical memory may be hardware storage devices having integrated circuits for storing information used in the VM manager 142 and VMs 143. The physical memory may be volatile memory (e.g., dynamic random-access memory (DRAM) or CPU cache memory) or non-volatile memory (e.g., hard drive or flash memory). In some embodiments, the physical memory may be non-transitory computer-readable storage medium, containing a set of instructions which, when executed by the physical CPU, cause the physical CPU to perform methods of cloud resource reservation in the multi-cloud environment. The NIC may be network communication hardware for transmitting messages in the VM cloud 140.

In some embodiments, the virtual hardware platform of the VM 143 may be configured with one or more "virtual hardware components" such as, without limitation, one or more virtual CPUs, virtual memory, virtual storage, virtual NIC, and/or additional virtual components. With helps from the VM manager 142, the virtual hardware components may emulate the behaviors and the computing capabilities of the physical hardware components, thereby allowing the VM 143 to function as if it were a physical machine 144. In some embodiments, the VM manager 142 may install a guest operating system (OS) and various software applications onto the VM 143. The OS may be a WINDOWS®, UNIX®, LINUX®, or iOS® operating system. The software applications may include any network, storage, graphic, or business applications that can be executed on the VMs 143 based on the OS. After the OS and applications are configured, the VM manager 142 may deploy the VM 143 into the VM cloud 140 to provide various cloud-based services.

In some embodiments, the VM manager 142 may discover and pool all the resources in the VM cloud 140 together to form the VM cloud resources 130. Specifically, the VM manager 142 may pool resources from all the physical machines 144 and all the VMs 143 together into multiple resource pools. For example, the VM manager 142 may pool all the physical CPUs and the virtual CPUs together into a CPU pool 131, collect all the physical and virtual memory into a memory pool 132, gather all the physical and virtual storages into a storage pool 133, and all the physical and virtual network resources into a network pool 134. In some embodiments, the VM manager 142 may further include the applications and cloud services implemented based on the VMs 143 as parts of the VM cloud resources 130. The VM cloud resources 130 may also be referred to as the "cloud resources" for VM cloud 140.

In some embodiments, the cloud 150 may be constructed based on physical machines 153. In this case, the cloud 150 may include a cloud manager (not shown in FIG. 1) configured to gather all the physical resources of the physical machines 153 into cloud resources 160, such as physical CPU pool 161, physical memory pool 162, physical storage pool 163, and/or physical network pool 164. The cloud manager of the cloud 150 may then provide these cloud resources 160 to its cloud resource consumers. For clarification purposes, the cloud 150 may represent any third-party cloud implemented using various cloud products. For example, the cloud 150 may be implemented using products such as OpenStack® Cloud, and/or AMAZON® S3 Cloud.

In some embodiments, a "cloud resource consumer" may be an application or a system desired to utilize the cloud resources provided by the clouds 140 and/or the cloud 150. In this case, the cloud resource consumer may utilize the cloud management server 120 to perform a cloud resource allocation operation, in order to obtain the required cloud resources for its usage. In some situations, the requested cloud resources may be in multiple clouds 140 and 150. The clouds 140 and 150 may have different physical hardware components, and/or have different configurations to their virtual hardware components. Thus, the cloud management server 120 needs to perform different cloud-based operations to allocate cloud resources in these clouds 140 and 150.

In some embodiments, the cloud management server 120 may include a reservation broker 123, which is configured to perform cloud resource reservations in a multi-cloud environment. "Reservation" may refer to an operation to guarantee a minimum amount (in terms of quantity or percentage) of certain cloud resources in the multi-cloud environment for a particular cloud resource consumer. In response to a reservation request, the reservation broker 123 may put aside the minimum amount of cloud resources, and make them exclusively available only to the designated cloud service consumer. The reservation broker 123 may avoid potential resource conflicts, such as resource constraints and resource borrowing, by never actually sharing the reserved VM cloud resources 130 and/or cloud resources 160 among multiple cloud resource consumers.

For example, a cloud service consumer may wish to set a lower bound on the cloud resources that can be allocated to a VM 143, or wish to guarantee that a particular VM 143 is allocated with a higher percentage of the cloud resources than other VMs 143 in the VM cloud 140. In this case, a user or application may utilize the cloud configuration client 110 to transmit a client reservation request to the cloud management server 120, for it to perform a resource reservation operation and establish suitable reservation policies in the VM cloud 140.

In some embodiments, the cloud management server 120 may include an allocation broker 123, which is configured to perform cloud resource allocation in a multi-cloud environment. "Allocation" may refer to an operation to obtain a specific amount and types of cloud resources from a reservation in the multi-cloud environment for a particular cloud resource consumer. The allocated cloud resources may then be utilized for provisioning one or more VMs 143. In other words, reserved cloud resources are more or less abstractive, as these cloud resources are not yet ascertained in terms of the actual resources in the VMs 143 and/or physical machines 144. In comparison, allocated cloud resources are more concrete and specific, as these cloud resources are identifiable based on the actual resources in the VMs 143 and/or physical machines 144. For example, a specific VMWare® vSphere reservation may be assigned with 10 GB of storage from a vSphere cluster in a cloud. A particular allocation of 2 GB of storage from the specific vSphere reservation may be provided by a specific physical machine 144 in the cloud, and the specific physical machine 144 may have at least 2 GB of storage assigned to the particular allocation. After allocation, the allocated resources may be used for the provisioning of a new vSphere VM 143, and may be deducted from the available resource quotas of the vSphere reservation.

In some embodiments, the cloud management server 120 may utilize the reservation broker 123 to perform resource reservation operations on different VM cloud 140 and cloud 150. The reservation broker 123 may further be configured to create a multi-cloud reservation on cloud resources that spread across multiple clouds 140 and 150. As each of the clouds 140 and 150 may be implemented using different vendors' products or have different configurations, rather than directly interacting with the clouds 140 and 150, the reservation broker 123 may utilize multiple cloud brokers 141 and 151 to create and manage reservations in these clouds 140 and 150. In other words, the reservation broker 123 may communicate with the cloud brokers 141 and 151, in order to reserve multi-cloud resources located in different clouds in a uniform and consistent way.

In some embodiments, the cloud management server 120 may utilize the allocation broker 125 to perform resource allocation operations on different VM cloud 140 and cloud 150. The allocation broker 125 may further be configured to allocate resources from a multi-cloud reservation that spreads across multiple clouds 140 and 150. As each of the clouds 140 and 150 may be implemented using different vendors' products or have different configurations, rather than directly interacting with the clouds 140 and 150, the allocation broker 125 may also utilize multiple cloud brokers 141 and 151 to create and manage allocates in a uniform and consistent approach. In other words, the allocation broker 125 may communicate with the cloud brokers 141 and 151, in order to allocate multi-cloud resources from reservations that are located in different clouds in a uniform and consistent way. In some embodiments, the reservation broker 123 and the allocation broker 125 may be implemented in a single module in the cloud management server 120.

In some embodiments, a "cloud broker" may be an application or module configured to reserve and/or allocate cloud resources in a specific cloud. In other words, each cloud broker may be tailored to a specific cloud, and can perform reservation-related and/or allocation-related tasks in view of the cloud's customized implementation and configurations. For example, the cloud broker 141 may be configured to perform reservations/allocations in the VM cloud 140, not the VM 150; and the cloud broker 151 may be configured to perform reservation/allocation tasks in the cloud 150, not in the VM cloud 140. Thus, each of the clouds 140 and 150 may be associated with a corresponding cloud broker (e.g., cloud broker 141 for VM cloud 140, and cloud broker 151 for cloud 150) dedicated to perform reservation/allocation related tasks in the cloud it is associated with. Alternatively, a cloud broker may register one or more handlers with the reservation broker 123 and/or the allocation broker 125, and the registered handlers may be configured to perform reservations and/or allocations on the clouds. For example, the cloud broker 1411 may be configured to create, update, or release reservations/allocations in the cloud 140, while the cloud broker 151 may be configured to register multiple handlers, each of which can be used by the reservation/allocation brokers to create, update, or release reservations/allocations in the cloud 150.

In some embodiments, the cloud broker 141 may be implemented as a component or service of the VM cloud 140. In other words, the cloud broker 141 may be operating within the VM cloud 140's environment. Alternatively, the cloud broker 151 may be implemented as an application or service external to the cloud 150. In this case, the cloud broker 151 may be located at a third-party system, acting as a cloud service customer of the cloud 150, and may perform reservation-related operations using network communications with the cloud 150. In addition, the cloud broker 151 may also be installed as a component of the cloud management server 120, and may interact with the reservation broker 123 using communications internal within the cloud management server 120.

In some embodiments, the cloud brokers 141 and 151 may utilize reservation types 135 to communicate with the reservation broker 123 with respect to the cloud resources available for reservation/allocation in a particular cloud. Specifically, a "reservation type" may be a data structure to define the type of cloud resources on which the cloud broker 141 is capable of performing a reservation/allocation related operation. A reservation type may also be used to define a cloud management entity with a set of cloud resources. Thus, the cloud broker 141 may supply a first set of reservation types 135 to the reservation broker 123 with respect to the cloud resources in VM cloud 140, while the cloud broker 151 may supply a second set of reservation types 165 to the reservation broker 123 with respect to the cloud resources in cloud 150. Some of the reservation types in the first set and the second set may be similar, while other in these two sets may be different. In other words, a cloud broker may support a reservation type that may not be supported by another cloud broker. For example, the VM cloud 140 may include mobile network communication services, while the cloud 150 may only provide conventional network communication services. In this case, the cloud broker 141 may support a specific reservation type 135 "mobile network", while the cloud broker 151 may not.

As illustrated by an example 1 below, a reservation type may include fields such as "id" or "name" to uniquely identifying itself. The reservation type may also include a field "cloud_broker_id" to store the identifier of the specific cloud broker it is associated with. The reservation type may further include a "schema" to describe the various cloud resources the cloud broker may be configured to reserve. Different cloud resources may need different approaches to describe. In a first approach, a simple cloud resource can be defined using a single value, such as a number, a string, or an object. A complex cloud resource may be described using a set of values, a complex data structure, or a set of objects. For a set of values, the cloud resource may be picked from a set of permissible selections. For example, a storage cloud resource may be selected from all virtual storages in the VM cloud. To populate the permissible selections, the reservation broker 123 may utilize a query operation to fetch the suitable resources from the clouds 140 and 150.

Example 1

```
Reservation Type
{
    Id = "cloud.reservation.vsphere_s3",
    Name = "vSphere S3",
    cloud_broker_id = 2,
    "schema":
    {resource[1]
        {id = "memory",
         Name = "Memory (MB)",
         data_type = "integer"},
     resource[2]
        {id = "storages",
         Name = "Storages (GB)",
         data_type:
         { type = "set",
            element_type_id = cloud.reservation.vsphere_s3.storage"
         }},
     resource[3]
        {id = "backup storage",
         name = "Backup Storage in S3 (GB)",
         data_type = "integer"},
    }
}
```

In the above example 1, the reservation type includes a schema with three cloud resources defined. The first cloud resource "resource [1]" may be a "memory" resource definable using an "integer." The second cloud resource "resource [2]" may be a "storage" resource definable using a set of values. Specifically, the set of values may be queried and retrieved by the reservation broker 123 based on a uniform resource locator (URL). The third cloud resource "resource [3]" may be a "backup storage" resource that can be described with an integer. Based on this reservation type, the reservation broker 123 may be able to provide to the cloud configuration client 110 a list of cloud resources on the VM cloud 140 that can be reserved, and may be able to determine which cloud broker it may utilize to perform the reservation-related tasks related to this list of cloud resources.

In some embodiments, to communicate the reservation types to the cloud management server 120, the cloud brokers 141 and 151 may register their respective supported reservation types with the reservation broker 123 in a registration process. The reservation broker 123, which may serve as the only reservation interface to the multi-cloud environment, is responsible for handling various reservation related operation requests from the cloud configuration client 110. Thus, the cloud configuration client 110 does not need to communicate with each of the clouds 140 and 150, and can rely on a generic service interface provided by the reservation broker 123 for managing the reservations. The reservation broker 123 may then use the corresponding cloud brokers 141 and 151 to communicate with the clouds 140 and 150. The cloud brokers 141 and 151 may then perform the actual reservation-related operations in their respective clouds 140 and 150.

In some embodiments, the cloud configuration client 110 may transmit different client requests to the cloud management server 120, requesting the reservation broker 123 to perform various reservation-related management operations and query operations. The cloud configuration client 110 and/or the reservation broker 123 may utilize a reservation object to describe a reservation or the particular cloud resources to be reserved. Specifically, a "reservation object" may be a data structure to define cloud resources on which reservation-related operations may perform. The reservation object may also be used to identify a reservation in a cloud. The reservation object may include identification information, such as a unique reservation id, the name of the reservation type, and other common properties. The reservation object may further include "resource data" to identify the cloud resources being reserved. The structure of the resource data may be based on the schema of the reservation types previously registered with the reservation broker 123, and may include a series of resource-literal pairs. Thus, the reservation types may be used to define what cloud resources can be reserved, and the reservation objects may be used to describe which cloud resources are reserved.

As illustrated by an example 2 below, a reservation object may include a field such as "name" to uniquely identify one reservation, and a "reservation_type_id" to specify which reservation type this reservation is based upon. Further, the reservation object may include resource data, which describes three cloud resources to be reserved. In the example 2, the first cloud resource may be "memory", and the quantity/amount of such resource to be reserved is "300 MB." The second cloud resource may be "storages", which includes two pieces of data that are chosen from a set of permissible selections provided in a reservation type's schema. Each of these two pieces of data may include corresponding "type_id" and "storage_id" to identify a particular storage resource, and may include a respective reservation size (e.g., "500 MB" or "800 MB"). The third cloud resource may be "backup_storage", with a quantity of "1000 MB."

Example 2

```
Reservation Object
{
    Name = "vSphere_S3_Reservation_01",
    reservation_type_id = "cloud.reservation.vsphere_s3",
    priority = 1,
    resources_data: {
        { key = "memory",
          Value = 300},
        { key = "storages",
          value: [
            { type_id = "cloud.reservation.vsphere_s3.storage",
              storage_id = "f48a527b-30a6-4d54-8829-f549bc195b69",
              reserved_size = "500"},
            { type_id = "cloud.reservation.vsphere_s3.storage",
              storage_id = "4e51fabc-19e8-4e79-b413-d52309b3bb62",
              reserved_size = "800"}}
          ]},
        { key = "backup_storage",
          Value = 1000}
    }
}
```

In some embodiments, the cloud configuration client 110 may transmit different client requests to the cloud management server 120, requesting the allocation broker 125 to allocate/de-allocate cloud resources from the multi-cloud environment. As multi-cloud allocation depends on multi-cloud reservation, the cloud configuration client 110 and the allocation broker 125 may need a uniform mechanism to locate the reservations form the multiple heterogeneous clouds 140 and 150, and perform allocation of the requested cloud resources in these reservations. In this case, the allocation broker 125 may utilize multiple cloud brokers 141 and 151 to create and manage allocations in the clouds 140 and 150. In other words, the allocation broker 125 may communicate with the cloud brokers 141 and 151, in order to allocate multi-cloud resources located in different clouds in a uniform and consistent way.

In some embodiments, each cloud broker (e.g., cloud broker 141 or cloud blocker 151) may manage one or more location handlers (e.g., location handlers 136 or 166) for identifying reservations that have sufficient available resource quota in the cloud with which cloud broker is associated. Each cloud broker may further manage one or more allocation handlers (e.g., allocation handlers 137 or 167) to allocate/de-allocate allocations in these reservations identified by the location handlers. In other words, the cloud broker 141 may utilize one or more location handlers 136 to find/discover reservations in the VM cloud 140; and utilize one or more allocation handlers 137 to perform cloud resource allocations on these discovered reservations. Alternatively, the allocation broker 125 may directly invoke (rather than utilize indirectly via the cloud broker 151) one or more location handlers 166 to find/discover reservations in the cloud 150; and invoke one or more allocation handlers 167 to perform cloud resource allocations in the cloud 150.

In some embodiments, a cloud broker may utilize a single location handler or allocation handler for multiple reservation types supported in a cloud. The cloud broker may also implement a specific location handler or a specific allocation handler for each reservation type in the cloud. The location handler and/or the allocation handler may be implemented using a workflow (e.g., a VMWare® vRO workflow) or a domain specific language (DSL) script that can be executed by the cloud management server 120. Further, the location handler and/or the allocation handler may access the available resource quotas of all the reservations, and the metadata information associated with any cloud resources in the cloud. Based on the available resource quotas and metadata information, the location handler and the allocation handlers may be able to locate reservations and create allocations therein.

In some embodiments, before the allocation broker 125 accepting client allocation requests, each of the cloud brokers 141 and 151 may perform an initialization process to register their respective location handlers and allocation handlers with the allocation broker 125. Specifically, after each cloud broker registers its supported reservation types with the reservation broker 123, the cloud broker may register the location handlers and allocation handlers that are associated with these registered reservation types.

Figure 2:
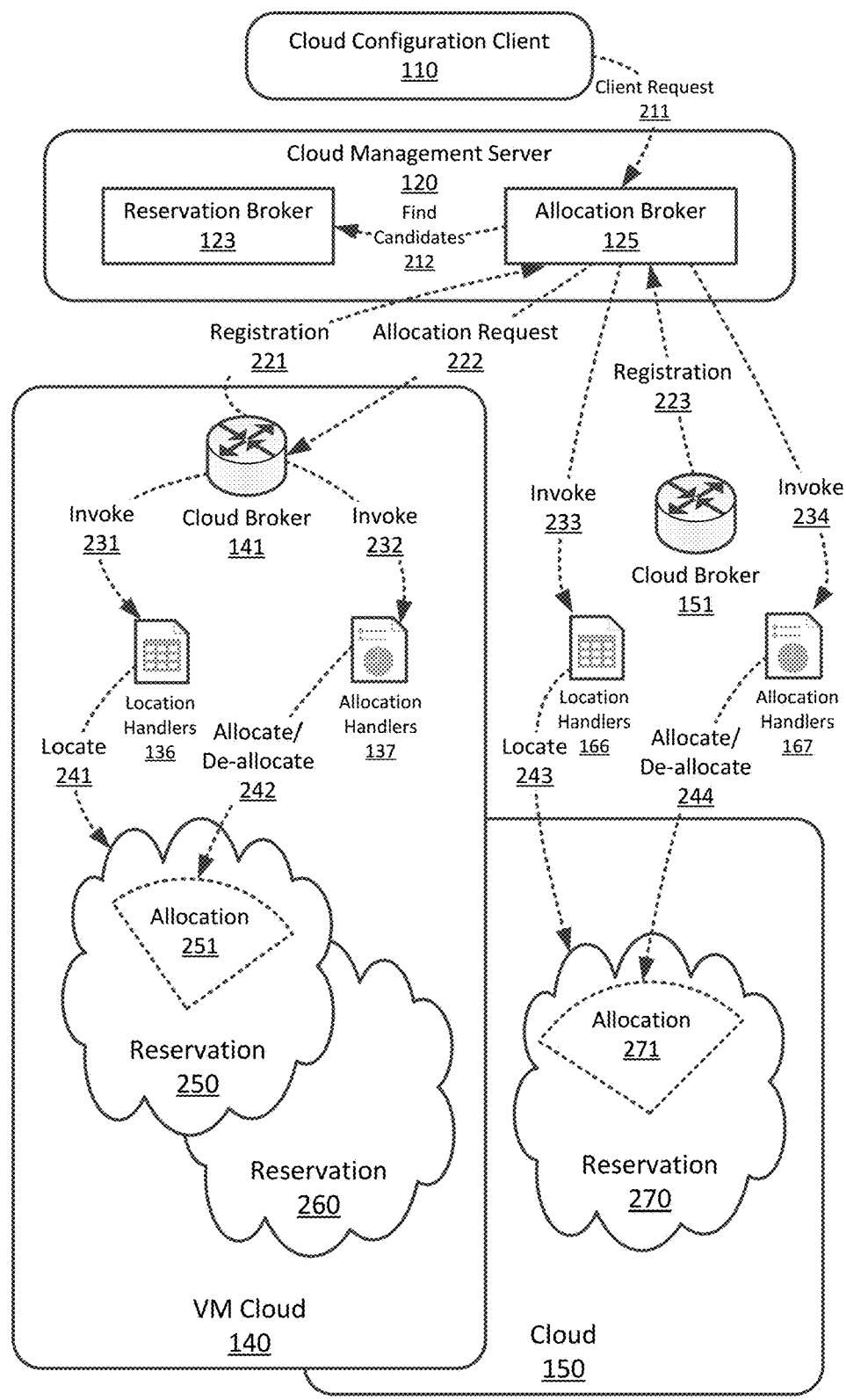
FIG. 2 illustrates scenarios related to multi-cloud resource allocation in a virtualized environment, according to one or more embodiments of the present disclosure.

FIG. 2 illustrates scenarios related to multi-cloud resource allocation in a virtualized environment, according to one or more embodiments of the present disclosure. In FIG. 2, the cloud configuration client 110, the cloud management server 120, the clouds 140 and 150, as well as the relevant components contained therein, correspond to their respective counterparts in FIG. 1. Reservations 250 and 260 may be previously created in the VM cloud 140, and reservation 270 may be previously created in the cloud 150. Further, an allocation 271 may be previously created in the reservation 270.

In some embodiments, before the allocation broker 125 is ready to perform any allocation-related tasks, each of the cloud brokers 141 and 151 may transmit a corresponding "registration" request to the allocation broker 125 to register the reservation types it supports. Specifically, the cloud broker 141 may transmit (221) a first registration request to the allocation broker 125, registering all the location handlers 136 and allocation handlers 137 that are associated with the reservation types supported in the VM cloud 140. Likewise, the cloud broker 151 may transmit (223) a second registration request to the allocation broker 125, registering the location handlers 166 and allocation handlers 167 that support reservation types in the cloud 150. After the initial registration processes, the allocation broker 125 may be ready to accept allocation-related client requests from the cloud configuration client 110.

In some embodiments, for each reservation type that is supported in the VM cloud 140 and registered with the reservation broker 123, the cloud broker 141 may maintain a corresponding location handler 136 and a corresponding allocation handler for such reservation type. In other words, each location handler 136 may be associated with a specific reservation type, for locating reservations in the VM cloud 140 that are previously created based on this specific reservation type. And each allocation handler 136 may be associated with a specific reservation type, for allocating cloud resources in reservations that are created based on this specific reservation type. Likewise, the location handlers 166 and the allocation handlers 167 may be associated with reservation types that are supported in the cloud 150. Alternatively, a single location handler 136 or a single allocation handler 137, which may be configured to perform flexible calculations on available resource quotas having fixed structures, may process multiple reservation types in the VM cloud 140.

In some embodiments, after processed the registration requests from the cloud brokers 141 and 151, the allocation broker 125 may be configured to receive (211) allocation-related client requests from the cloud configuration client 110 or from another internal component operating in the cloud management server 120 (e.g., a provisioning module). Specifically, the allocation-related client requests may request the allocation broker 125 to perform allocation, de-allocation, query, or any operations associated with resource allocation. For allocation-purposes, the allocation-related client request may contain a reservation type and an "allocation request" organized as a set of field-literal pairs. The allocation request may be flexible to support the requesting for various types of cloud resources. For example, for a client request to allocate 100 MB of memory, 200 GB of storage, and 300 GB of backup storage, the allocation request may include a set of field-literal pairs (e.g., memory=100 MB, storage=200 GB, and backup=300 GB). For de-allocation or re-allocation purposes, the allocation-related client request may contain an allocation identifier that can be used to identify an allocation in the multi-cloud environment.

In some embodiments, after having received an allocation-related client request, the allocation broker 125 may transmit a "find-candidate internal request" (212) to the reservation broker 123, requesting it to provide a set of "reservation candidates" or "cloud candidates" that are associated with the reservation type contained in the allocation-related client request. Each cloud candidate may specify a particular cloud in which one or more reservations may be associated with the reservation type. A location handler (e.g., the location handler 136) may be configured to locate a particular cloud based on a cloud candidate, and search and identify reservations in the particular cloud that is associated with the reservation type. In comparison, each reservation candidate may specify a particular reservation that is associated with the reservation type in a cloud. In this case, another location handler (e.g., the location handler 166) may be configured to directly locate a reservation in a cloud based on a reservation candidate.

In some embodiments, the reservation broker 123 may maintain a set of reservation objects associated with the reservations in the multi-cloud environment that are managed by the reservation broker 123. In response to the find-candidate internal request, the reservation broker 123 may filter through the set of reservation objects, and generate a set of reservation candidates based on a subset of reservation objects that are associated with the reservation type contained in the allocation-related client request. Afterward, the reservation broker 123 may transmit the subset of reservation objects as reservation candidates to the allocation broker 125 in response to the find-candidate internal request 212. Alternatively, the reservation broker 123 may filter through the set of reservation objects, and generate a set of cloud candidates including a subset of clouds that are associated with the reservation type contained in the allocation-related client request. Afterward, the reservation broker 123 may transmit the cloud candidates to the allocation broker 125 in response to the find-candidate internal request 212.

In some embodiments, for each of the cloud candidates received from the reservation broker 123, the allocation broker 125 may identify one of the cloud brokers (e.g., cloud broker 141) associated with the cloud identified in the cloud candidate. In other words, the identified cloud broker may be associated with the cloud identified in the cloud candidate. For each cloud candidate, the allocation broker 125 may construct an "allocation-related internal request" including the reservation type and the specific allocation request from the client request, and transmit this allocated-related internal request to the identified cloud broker. In some embodiments, the allocation broker 125 may construct a set of allocation-related internal requests for all the cloud candidates, and transmit (222) these allocation-related internal requests one-by-one to their respective cloud brokers, until receiving an allocation-successful message from one of the cloud brokers in response to one of the transmitted allocation-related internal requests.

In some embodiments, once the cloud broker 141 received one allocation-related internal request, it may extract the reservation type contained therein, and identify a specific location handler 136 that is associated with this reservation type. Afterward, the cloud broker 141 may invoke (231) the specific location handler 136, for it to locate (241) all reservations in the VM cloud 140 that are associated with the specific reservation type. Afterward, the location handler 136 may evaluate the available resource quotas for all the located reservations, and determine whether any one of the reservations can satisfy the allocation request. A reservation's "available resource quota" may refer to the total available cloud resources (e.g., CPU, memory, storage, and network resources) in the reservation that can be allocated.

In some embodiments, if one reservation's available resource quota reservation cannot satisfy the allocation request, the location handler 136 may select another reservation from the located reservations, and evaluate its available resource quota. If none of the located reservations in the VM cloud 140 satisfy the allocation request, the location handler 136 may return a failed message to the cloud broker 141, which may also return a failed message to the allocation broker 125. In this case, the allocation broker 125 may select another reservation candidate from the list of reservation candidates received from the reservation broker 123, and repeat the above operations to find a suitable reservation that can satisfy the allocation request.

In some embodiments, if a reservation's available resource quota can satisfy the allocation request, the location handler 136 may generate an "allocation object" for the allocation handler 137 that is associated with the same reservation type. An "allocation object" may refer to a detailed selection of cloud resources from a reservation's available resource quota, and such a selection can be used for the creation of an allocation. The allocation object may also be used to describe a created allocation in a reservation. The example 3 below illustrate an allocation object, which may include a field such as "reservation_name" to uniquely identify the reservation the allocation is created from, and a set of "resources_data" to specify the reservation resources that are allocated. The resources_data may describe three cloud resources to be allocated: "100 MB" of "memory", 200 BM of "storages" from a particular storage space identified by the "storage_id", and "300 MB" of "backup_storage."

Example 3

Allocation Object
{
  "reservation_name":"vSphere_S3_Reservation_01",
  "resources_data":[
    {
      "key":"memory",
      "value":100
    },
    {
      "key":"storages",
      "value":[
        {
          "type_id":"cloud.reservation.vsphere_s3.storage",
          "storage_id":"4e51fabc-19e8-4e79-b413-d52309b3bb62",
          "size":"200"
        }
      ]
    },
    {
      "key":"backup_storage",
      "value":300
    }
  ]
}

In some embodiments, assuming the location handler 136 evaluated multiple reservations 250 and 260 in the VM cloud 140, and determined that reservation 250 can satisfy the allocation request, the location handler 136 may return a success message containing the allocation object to the cloud broker 141. Based on this success message, the cloud broker 141 may invoke (232) the associated allocation handler 137, and request the allocation handler 137 to create an allocation 251 in the reservation 250. The allocation handler 137 may accept from the cloud broker 141 the available resource quota of the reservation 250 and the allocation object as inputs. Afterward, the allocation handler 137 may create the allocation 251 based on the allocation object, and deduct the requested cloud resources from the reservation 250's available cloud quota. For example, the allocation handler 137 may deduct the requested memory size, storage size, and backup-storage size in the allocation object from the available memory size, storage size, and backup-storage size of the reservation 250. The deducted cloud resources may be marked and become exclusively available to the allocation 251.

In some embodiments, after successfully create the allocation 251, the allocation handler 137 may generate and store an "adjusted available resource quota" for the reservation 250. The adjusted available resource quota may show the remaining cloud resources in the reservation 250. As illustrated by an example 4 below, the adjusted available resource quota may contain a set of resources_data (showing less cloud resources after allocation) than the resources_data in the above example 2. The allocation handler 137 and the cloud broker 141 may return the adjusted available resource quota to the cloud management server 120 for its storage. Subsequently, the reservation broker 123 and the allocation broker 125 may use this adjusted available resource quota as reservation 250's available resource quota for subsequent reservation-related or allocation-related operations.

---

Example 4

Adjusted Available Resource Quota
{
  "reservation_name":"vSphere_S3_Reservation_01",
  "resources_data":[
    {
      "key":"memory",
      "value":200
    },
    {
      "key":"storages",
      "value":[
        {
          "type_id":"cloud.reservation.vsphere_s3.storage",
          "storage_id":"f48a527b-30a6-4d54-8829-f549bc195b69",
          "size":"500"
        },
        {
          "type_id":"cloud.reservation.vsphere_s3.storage",
          "storage_id":"4e51fabc-19e8-4e79-b413-d52309b3bb62",
          "size":"600"
        }
      ]
    },
    {
      "key":"backup storage",
      "value":700
    }
  ]
}

---

In some embodiments, once successfully performed the allocation-related operation in the VM cloud 140 and/or cloud 150, the cloud broker 141 may return a success response to the allocation broker 125. Alternatively, if the allocation-related operation failed to allocate the necessary cloud resources in the clouds 140 and 150, the cloud broker 141 may roll-back all already-performed operations to restore the clouds 140 and 150 back to their original states before the allocation-related operation. Specifically, the cloud broker 141 may release any cloud resources that have been allocated during the failed allocation-related operation, and restore any changes to the configurations in the clouds 140 and 150 as well. Afterward, the cloud broker 141 may return a failed response to the allocation broker 125.

In some embodiments, once the allocation broker 125 received the success message from the cloud broker 141, it may record/save the adjusted available resource quotas and the allocation object into its database, and return a success message to the cloud configuration client 110 in response to the client request. If the allocation broker 125 received a failed message from the cloud broker 141, it will not save the adjusted available resource quotas and the allocation object in its database, and will instead return a failed message in response to the client request 211. Through the above approaches, multi-cloud resources can be isolated, allocated and managed in a uniform approach.

In some embodiments, rather than transmitting (222) an allocation-related internal request to the cloud broker and requesting the cloud broker to invoke the location handlers and allocation handlers, the allocation broker 125 may directly invoke the location handlers and allocation handlers to perform allocation-related operations without cloud broker's participation. Specifically, for each of the reservation candidates received from the reservation broker 123, the allocation broker 125 may identify the location handlers (e.g., location handlers 166) and the allocation handlers (e.g., allocation handlers 167) associated with the reservation candidate. In other words, the location handlers 166 and allocation handlers 167 associated with the reservation candidate may be previously registered (223) by the cloud broker 151 along with the corresponding reservation type with which the reservation candidate is associated with. For each reservation candidate, the allocation broker 125 may construct an "allocation-related invocation request" including the reservation type and the specific allocation request from the client request, and pass this allocated-related invocation request to the location handlers 166 that are being invoked (233). In some embodiments, the allocation broker 125 may construct a set of allocation-related invocation requests for all the reservation candidates, and invoke (233) the respective location handlers 166 one-by-one using these allocation-related invocation requests.

In some embodiments, after being invoked (233) by the allocation broker 125, the specific location handler 166 may extract a reservation identifier from the allocation-related invocation request, and locate (243) a particular reservation in the VM cloud 150 based on the reservation identifier. Afterward, the location handler 136 may evaluate the available resource quotas for the located reservation, and determine whether it can satisfy the allocation request. If this reservation's available resource quota reservation cannot satisfy the allocation request, the location handler 166 may return a failed message to the allocation broker 125, which may select another reservation candidate from the list of reservation candidates received from the reservation broker 123, and repeat the above operations to find a suitable reservation that can satisfy the allocation request.

In some embodiments, if a reservation's available resource quota can satisfy the allocation request, the location handler 166 may generate an allocation object for the allocation handler 167 that is associated with the same reservation type. Assuming the location handler 166 determined that reservation 270 can satisfy the allocation request, the location handler 166 may return a success message containing the allocation object to the allocation broker 125. Based on this success message, the allocation broker 125 may invoke (234) the specific allocation handler 167 that is associated with the reservation type, and request the allocation handler 167 to create an allocation 271 in the reservation 270. The allocation handler 167 may accept from the allocation broker 125 the available resource quota of the reservation 270 and the allocation object as inputs. Afterward, the allocation handler 167 may create the allocation 271 based on the allocation object, and deduct the requested cloud resources from the reservation 270's available cloud quota. The deducted cloud resources may be marked and become exclusively available to the allocation 271.

In some embodiments, after successfully create the allocation 271, the allocation handler 167 may generate and store an "adjusted available resource quota" for the reservation 270. The adjusted available resource quota may show the remaining cloud resources in the reservation 270. The allocation handler 167 may return the adjusted available resource quota to the cloud management server 120 for its storage. Subsequently, the reservation broker 123 and the allocation broker 125 may use this adjusted available resource quota as reservation 270's available resource quota for subsequent reservation-related or allocation-related operations.

In some embodiments, the allocation handler may be configured to perform de-allocation and/or re-allocation operations on the allocations that are already in the reservation. In this case, the allocation broker 125 may be configured to support de-allocation client requests and re-allocation client requests from the cloud configuration client 110. For example, the reservation 270 may contain an allocation 271 previously created by the location handler 166 and the allocation handler 167 that correspond to a specific reservation type associated with the reservation 270. The allocation broker 125 may receive a de-allocation or re-allocation client request for de-allocating/re-allocating the allocation 271. In this case, the de-allocation client request may contain an allocation identifier for identifying the allocation 271 in the multi-cloud environment.

In some embodiment, based on the allocation identifier in the client request, the allocation broker 125 may retrieve a corresponding allocation object from its database. The retrieve allocation object may be created during the creation of the allocation 271, and may contain sufficient information to identify the cloud 150 and the reservation 270. The allocation broker 125 may identify the allocation handler 167 that is associated with the reservation 270, and invoke (234) the allocation handler 167 using a de-allocation/re-allocation invocation request containing the allocation object to the cloud broker 151. Based on the allocation object in the de-allocation/re-allocation invocation request, the allocation handler 167 may perform the de-allocation/re-allocation accordingly.

In some embodiments, for de-allocation operation, the allocation handler 167 may delete the allocation 271 and release the cloud resources in the allocation 271 back to the reservation 270. Afterward, the allocation handler 167 may generate an adjusted available resource quota for the reservation 270, and store/transmit the adjusted available resource quota as described above. In this case, the adjusted available resource quota may include the cloud resources released from the allocation 271.

In some embodiments, a re-allocation operation may be defined as a de-allocation operation followed by another allocation operation. In this case, the allocation handler 167 may delete the allocation 271 from the reservation 270, and create a new allocation in the cloud 150. Even though the newly-created allocation may take up the same amount of cloud resources as the de-allocated allocation 271, the newly-created allocation may be in a different reservation (other than reservation 270) in the cloud 150, or in a reservation of a different cloud (other than cloud 150). In other words, the allocation performed during the re-allocation operation may follow the same process as shown above, in which the allocation broker 125 may select another reservation in another cloud that supports the reservation type and has sufficient available resource quota, and create the allocation in this newly located reservation.

In some embodiments, the reservations in the clouds 140 and 150 may be updated, and their available resource quotas may be changed. In this case, the allocation broker 125 may recalculate of the available resource quotas for all the reservations in the clouds 140 and 150, rather than depending on the available resource quotas that are previously recorded in its database. Further, the allocation broker 125 may recalculate the available resource quotas based on the allocation objects associated with all the allocation/de-allocation operations. In this way, the up-to-date available resource quotas may cover all history allocations, and the reservation broker 125 may deny any allocation requests that may be accepted based on outdated available resource quotas and allocation objects.

Figure 3:
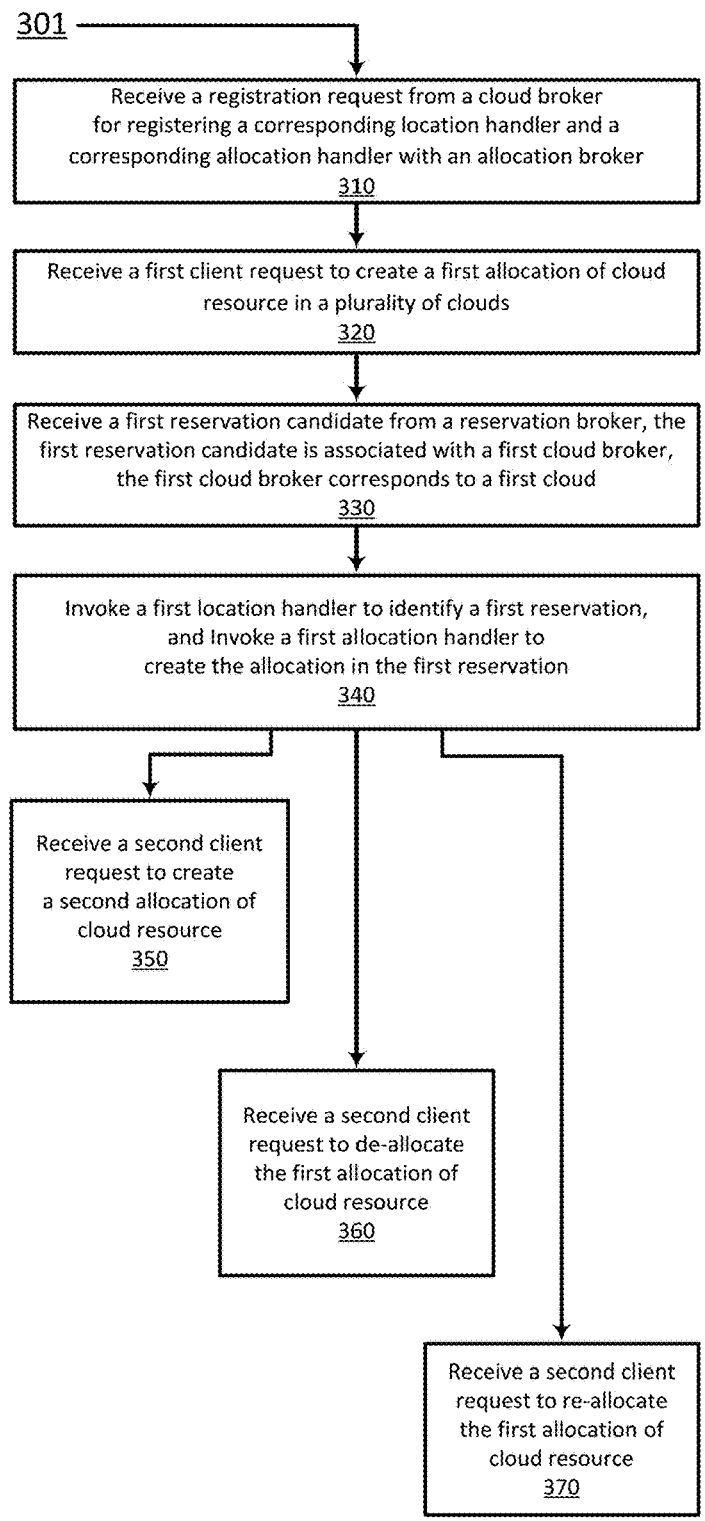
FIG. 3 shows a flow diagram illustrating a process to allocate cloud resources in a multi-cloud environment, according to one or more embodiments of the present disclosure.

FIG. 3 shows a flow diagram illustrating a process 301 to allocate cloud resources in a multi-cloud environment, according to one or more embodiments of the present disclosure. The process 301 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, the multi-cloud environment may include a plurality of clouds and a cloud management server. The plurality of clouds may be associated with a corresponding plurality of cloud brokers. Specifically, each of the plurality of clouds may be associated with a corresponding one of the plurality of cloud brokers; and each of the plurality of cloud brokers may be associated with a corresponding location handler and a corresponding allocation handler.

In some embodiments, the cloud manager server may include a reservation broker and an allocation broker both of which are configured to communicate with each of the plurality of cloud brokers. The allocation broker may receive a corresponding registration request from each of the plurality of cloud brokers for registering its corresponding location handler and its corresponding allocation handler. In other words, for a first cloud selected from the plurality of clouds and associated with a first cloud broker selected from the plurality of cloud brokers, the allocation broker may receive a registration request from the first cloud broker for registering with the allocation broker the first location handler and the first allocation handler, both of which are associated with the first cloud broker.

In some embodiments, before the plurality of cloud brokers registering the corresponding location handlers and allocation handlers, the reservation broker may receive a corresponding registration request from each of the plurality of cloud brokers for registering corresponding reservation types that are supported in each of the plurality of clouds. In other words, the reservation broker may receive a registration request from the first cloud broker for registering with the reservation broker a first reservation type that is supported in the first cloud.

At block 320, the allocation broker may receive a first client request to create a first allocation of cloud resource in the plurality of clouds. The first client request may include a first reservation type supported by the first cloud.

At block 330, the allocation broker may transmit a find-candidate request to the reservation broker using the first reservation type. The allocation broker may receive, from the reservation broker in response to the find-candidate request, a list of reservation candidates each of which is associated with one or more reservations in the plurality of clouds that are previously created based on the first reservation type. In other words, the allocation broker may receive a first reservation candidate selected from the list of reservation candidates. The first reservation candidate may be associated with reservations in the first cloud.

At block 340, the allocation broker may identify the first location handler and the first allocation handler associated with the first reservation type. The allocation broker may invoke the first location handler to identify multiple reservations in the first cloud that are created based on the first reservation type, and determine whether a first reservation from the multiple reservations has sufficient available resource quota to support the first allocation of cloud resource. In response to a determination that the first reservation has sufficient available resource quota to support the first allocation, the first allocation broker may invoke the first allocation handler to create the first allocation of cloud resource in the first reservation.

In some embodiments, the allocation broker may utilize the first cloud broker to perform the allocation operations. Specifically, the allocation broker may transmit a first allocation request to the first cloud broker. The first allocation request may include the first reservation type and information related to the first allocation of cloud resource. The allocation broker may utilize the first location handler to identify multiple reservations in the first cloud that are created based on the first reservation type. Afterward, the first location handler may determine whether a first reservation from the multiple reservations has sufficient available resource quota to support the first allocation of cloud resource. In response to a determination that the first reservation has sufficient available resource quota to support the first allocation, the first cloud broker may utilize the first allocation handler to create the first allocation of cloud resource in the first reservation.

In some embodiments, in response to the first location handler's determination that the first reservation has insufficient resource quota and a second reservation from the multiple reservations has sufficient resource quota to support the first allocation, the allocation broker may invoke the first allocation handler to create the first allocation of cloud resource in the second reservation. Alternatively, the first location handler may iterate though the multiple reservations in the first cloud until finding the reservation with the sufficient resource quota to support creation of the first allocation of cloud resource therein.

In some embodiments, after the creation of the first allocation, the allocation handler may generate an adjusted available resource quota for the first reservation, and the allocation broker may store the adjusted available resource quota in a database. Afterward, the process 301 may selectively proceed from block 340 to block 350, block 360, or block 370.

At block 350, the allocation broker may receive a second client request to create a second allocation of cloud resource in the plurality of clouds. The allocation broker may then receive a second reservation candidate based on a second reservation type identified by the second client request. The second reservation candidate is associated with a second cloud selected from the plurality of clouds, and the second cloud corresponds to a second cloud broker selected from the plurality of cloud brokers.

In some embodiments, the allocation broker may invoke a second location handler corresponding to the second reservation type to identify a second reservation in the second cloud having sufficient resource quota to support the second allocation of cloud resource, and invoke a second allocation handler corresponding to the second reservation type to create the second allocation of cloud resource in the second reservation.

At block 360, the allocation broker may receive a second client request to de-allocate the first allocation of cloud resource. The second client request may include information to identify the first allocation in the plurality of clouds. In some embodiments, the allocation broker may identify that the first allocation may be located in the first reservation of the first cloud. Afterward, the allocation broker may invoke the first allocation handler to de-allocate the first allocation in the first reservation.

At block 370, the allocation broker may receive a second client request to re-allocate the first allocation of cloud resource. The second client request may include information to identify the first allocation in the plurality of clouds. In some embodiments, the allocation broker may identify that the first allocation may be located in the first reservation of the first cloud. Afterward, the allocation broker may invoke the first allocation handler to de-allocate the first allocation and allocate a second allocation of cloud resource in the first reservation. The first allocation and the second allocation may include the same amount of cloud resource.

Thus, systems and methods for allocating resources in a multi-cloud environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for allocating resources in a multi-cloud environment, the method comprising:

receiving, by an allocation broker executing in the multi-cloud environment, a first client request to create a first allocation of cloud resource in a plurality of clouds, wherein the plurality of clouds are associated with a corresponding plurality of cloud brokers, and the allocation broker is configured to communicate with each of the plurality of cloud brokers;

receiving, by the allocation broker from a reservation broker coupled with the allocation broker, a first reservation candidate based on a first reservation type identified by the first client request and having been registered by a first cloud broker selected from the plurality of cloud brokers with the reservation broker, wherein the first reservation candidate is associated with a first cloud selected from the plurality of clouds, and the first cloud corresponds to the first cloud broker;

invoking, by the allocation broker, a first location handler corresponding to the first reservation type to identify a first reservation in the first cloud having sufficient resource quota to support the first allocation of cloud resource; and invoking, by the allocation broker, a first allocation handler corresponding to the first reservation type to create the first allocation of cloud resource in the first reservation.

2. The method as recited in the claim 1, further comprising:

prior to the receiving of the first client request, receiving, by the allocation broker, a first registration request from the first cloud broker for registering the first location handler and the first allocation handler with the allocation broker.

3. The method as recited in the claim 2, further comprising:

prior to the receiving of the first registration request, receiving, by the reservation broker, a second registration request from the first cloud broker for registering the first reservation type with the reservation broker.

4. The method as recited in the claim 1, further comprising:

receiving, by the allocation broker, a second client request to create a second allocation of cloud resource in the plurality of clouds;

receiving, by the allocation broker from the reservation broker, the first reservation candidate based on the first reservation type identified by the second client request;

invoking, by the allocation broker, the first location handler to identify a second reservation in the first cloud having sufficient resource quota to support the second allocation of cloud resource; and invoking, by the allocation broker, the first allocation handler to create the second allocation of cloud resource in the second reservation.

5. The method as recited in the claim 4, wherein the first location handler identifies the second reservation upon a determination that the first reservation in the first cloud has insufficient resource quota to support the second allocation of cloud resource.

6. The method as recited in the claim 1, further comprising:

receiving, by the allocation broker, a second client request to create a second allocation of cloud resource in the plurality of clouds;

receiving, by the allocation broker from the reservation broker, a second reservation candidate based on a second reservation type identified by the second client request, wherein the second reservation candidate is associated with a second cloud selected from the plurality of clouds, and the second cloud corresponds to a second cloud broker selected from the plurality of cloud brokers;

invoking, by the allocation broker, a second location handler corresponding to the second reservation type to identify a second reservation in the second cloud having sufficient resource quota to support the second allocation of cloud resource; and invoking, by the allocation broker, a second allocation handler corresponding to the second reservation type to create the second allocation of cloud resource in the second reservation.

7. The method as recited in the claim 6, further comprising:

prior to the receiving of the second client request, receiving, by the allocation broker, a registration request from the second cloud broker for registering the second location handler and the second allocation handler with the allocation broker.

8. The method as recited in the claim 1, further comprising:

generating, by the first allocation handler, a reservation available quota for the first reservation, wherein the reservation available quota contains adjusted amount of cloud resources in the first reservation after the creation of the first allocation.

9. The method as recited in the claim 8, further comprising:

in response to the determination that the first allocation handler successfully creating the first allocation of cloud resource in the first cloud, storing, by the allocation broker, the reservation available quota in a database.

10. The method as recited in the claim 1, further comprising:

receiving, by the allocation broker, a second client request to de-allocate the first allocation of cloud resource, wherein the second client request identifies the first allocation; and invoking, by the allocation broker, the first allocation handler to de-allocate the first allocation in the first reservation.

11. A non-transitory computer-readable storage medium, containing a set of instructions which, in response to execution by a processor, cause the processor to perform a method for allocating resources in a multi-cloud environment, the method comprising:

receiving, by an allocation broker executing in a management server, a client request to create a first allocation of cloud resource in a plurality of virtual machine (VM) clouds, wherein the allocation broker is configured to interact with a plurality of cloud brokers associated with the plurality of VM clouds;

selecting, by a reservation broker communicating with the allocation broker, a set of cloud brokers from the plurality of cloud brokers, wherein the set of cloud brokers support and register a reservation type contained in the first client request with the reservation broker; and for a first cloud broker selected from the set of cloud brokers and associated with a first VM cloud, transmitting, by the allocation broker, an allocation request to the first cloud broker, wherein the first cloud broker is configured to:

utilize a first location handler corresponding to the first cloud broker to identify whether a first reservation from multiple reservations in the first VM cloud supports the first allocation of cloud resource, and in response to a determination that the first reservation has sufficient resource quota to support the first allocation, utilize a first allocation handler corresponding to the first cloud broker to create the first allocation of cloud resource in the first reservation.

12. The non-transitory computer-readable storage medium of the claim 11, wherein the method further comprising:

prior to the receiving of the client request, receiving, by the allocation broker, a corresponding registration request from each of the plurality of cloud brokers for registering a corresponding location handler and a corresponding allocation handler associated with the each of the plurality of cloud brokers.

13. The non-transitory computer-readable storage medium of the claim 11, wherein the first cloud broker is further configured to in response to a determination that the first reservation has insufficient resource quota and a second reservation from the multiple reservations has sufficient resource quota to support the first allocation, utilize the first allocation handler to create the first allocation of cloud resource in the second reservation.

14. The non-transitory computer-readable storage medium of the claim 11, wherein the method further comprising:

in response to a determination that none of the multiple reservations has sufficient resource quota to support the first allocation, transmitting, by the allocation broker, the allocation request to a second cloud broker selected from the set of cloud brokers and associated with a second VM cloud, wherein the second cloud broker is configured to utilize a second location handler and a second allocation handler corresponding to the second cloud broker to create the first allocation of cloud resource in the reservations of the second VM cloud.

15. The non-transitory computer-readable storage medium of the claim 11, wherein the cloud resource includes virtualized resource provided by one or more VMs in the plurality of VM clouds.

16. A system for allocating resources in a multi-cloud environment, the system comprising a plurality of clouds associated with a plurality of cloud brokers; and a cloud management server coupled with the plurality of clouds, wherein the cloud manager server contains a reservation broker configured to manage reservations in the plurality of clouds and an allocation broker configured to manage allocations in the reservations, and the allocation broker is configured to receive a first client request to create a first allocation of cloud resource in the plurality of clouds, receive, from the reservation broker, a first reservation candidate based on a first reservation type identified by the first client request and having been registered by a first cloud broker selected from the plurality of cloud brokers with the reservation broker, wherein the first reservation candidate is associated with a first cloud selected from the plurality of clouds, and the first cloud corresponds to the first cloud broker, invoke a first location handler corresponding to the first reservation type to identify a first reservation in the first cloud having sufficient resource quota to support the first allocation of cloud resource, and invoke a first allocation handler corresponding to the first reservation type to create the first allocation of cloud resource in the first reservation.

17. The system of claim 16, wherein prior to the receiving of the first client request, the allocation broker is further configured to
receive a first registration request from the first cloud broker for registering the first location handler and the first allocation handler associated with the first cloud broker.

18. The system of claim 17, wherein prior to the receiving of the first registration request by the allocation broker, the reservation broker is configured to
receive a registration request from the first cloud broker for registering the first reservation type associated with first cloud.

19. The system of claim 16, wherein the allocation broker is further configured to
receive a second client request to de-allocate the first allocation of cloud resource, wherein the second client request identifies the first allocation, and
invoke the first allocation handler to de-allocate the first allocation in the first reservation.

20. The system of claim 16, wherein the allocation broker is further configured to
receive a second client request to re-allocate the first allocation of cloud resource, wherein the second client request identifies the first allocation,
invoke the first allocation handler to de-allocate the first allocation in the first reservation, and
invoke the first allocation handler to allocate a second allocation of the cloud resource in the first reservation.

* * * * *